United States Patent [19]

Ives et al.

[11] 4,257,748
[45] Mar. 24, 1981

[54] FLOW INDICATOR FOR POSITIVE DISPLACEMENT PUMP

[75] Inventors: Frank E. Ives, Kent; Terrence G. Nash, Renton, both of Wash.

[73] Assignee: Venus Products, Inc., Kent, Wash. ; by said Terrace G. Nash, a part interest

[21] Appl. No.: 573

[22] Filed: Jan. 2, 1979

[51] Int. Cl.$^3$ .............................................. F04B 21/00
[52] U.S. Cl. ........................................ 417/63; 73/307; 116/228; 222/40; 222/155; 285/39; 285/161
[58] Field of Search ............... 417/63, 557, 540; 91/1; 92/5; 222/40, 155; 116/228; 73/307, 319; 285/161, 206, 39

[56] References Cited

U.S. PATENT DOCUMENTS

| | | | |
|---|---|---|---|
| 358,285 | 2/1887 | Maxey | 116/228 X |
| 2,483,924 | 10/1949 | Moulinier | 417/63 |
| 2,629,089 | 2/1953 | Fairbairn et al. | 417/63 X |
| 3,104,120 | 9/1963 | Myers | 285/161 |
| 3,956,934 | 5/1976 | White | 222/155 X |

FOREIGN PATENT DOCUMENTS 2264230 10/1975 France ..................... 285/161

*Primary Examiner*—Carlton R. Croyle
*Assistant Examiner*—Edward Look
*Attorney, Agent, or Firm*—Christensen, O'Connor, Johnson & Kindness

[57] ABSTRACT

A flow indicator for a positive displacement pump is connected to a liquid supply reservoir below the liquid level in the reservoir. The indicator has a first passage through which liquid is supplied from the reservoir to the inlet of the pump. The first passage has an inlet below the liquid level in the reservoir and an outlet coupled to a supply conduit in turn coupled to the pump inlet. A restrictor is positioned in the first passage adjacent the inlet to partially restrict fluid flow through the passage. A secondary passage is coupled in fluid communication with the first passage downstream from the restrictor. A transparent tube is coupled to the secondary passage and extends upwardly alongside the reservoir to a location above the liquid level in the reservoir. A float is slidably positioned in the transparent tube. When the pump is not operating or is functioning on a return stroke, as opposed to a suction stroke, the liquid level in the tube seeks the same as the liquid level in the reservoir, thereby positioning the float adjacent the liquid level in the reservoir. When the pump draws liquid from the reservoir through the flow indicator, the restrictor is sized so that only a portion of the liquid is drawn from the reservoir, while the remaining liquid is drawn through the secondary passage from the transparent tube. As liquid is drawn from the reservoir and the transparent tube, the liquid level in the tube lowers, causing the float to visibly drop within the tube. The restrictor is sized so that during the return stroke of the pump liquid flows from the reservoir into the transparent tube, returning the liquid level in the tube and thus the float to the same level as the reservoir liquid level.

9 Claims, 3 Drawing Figures

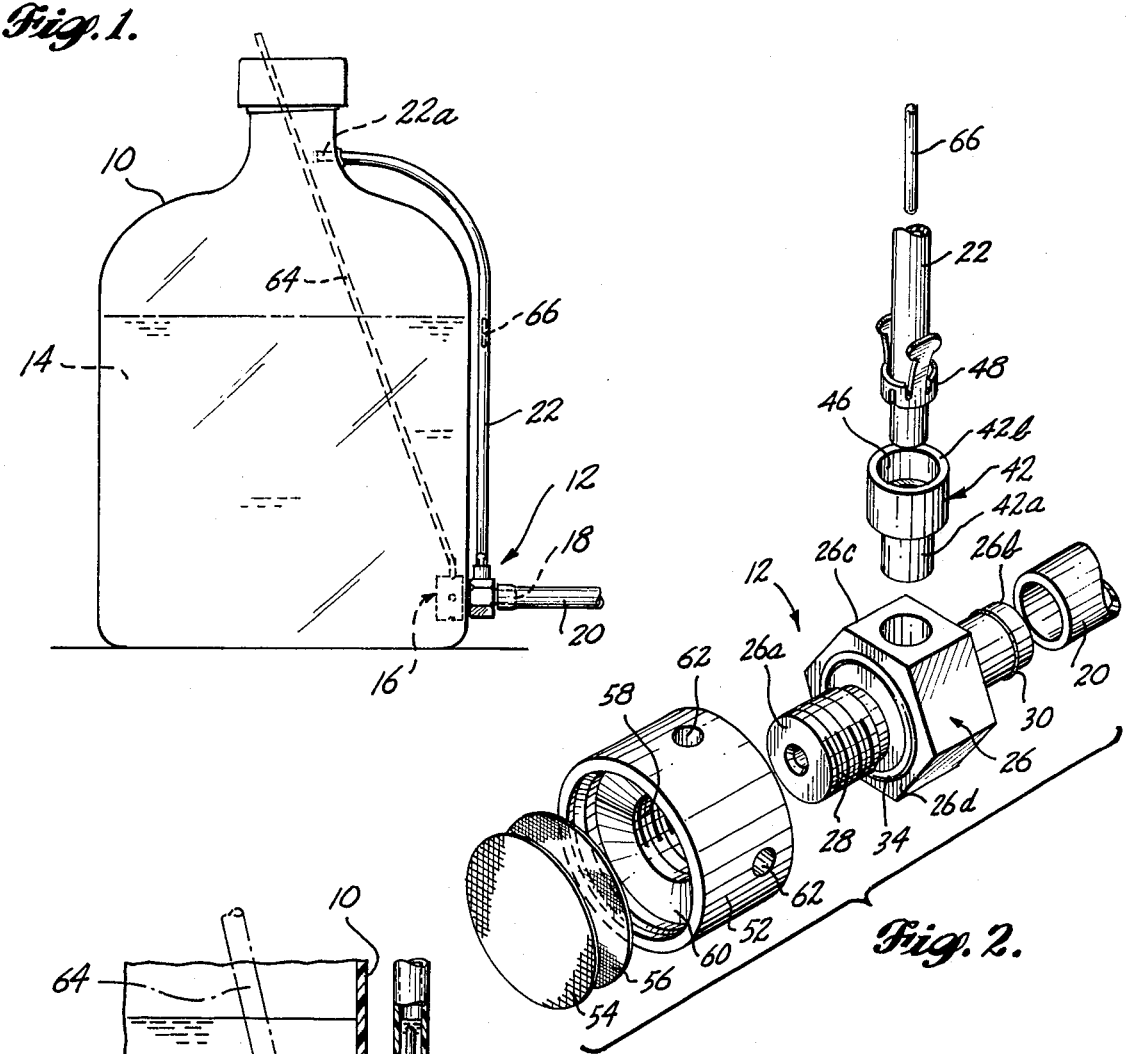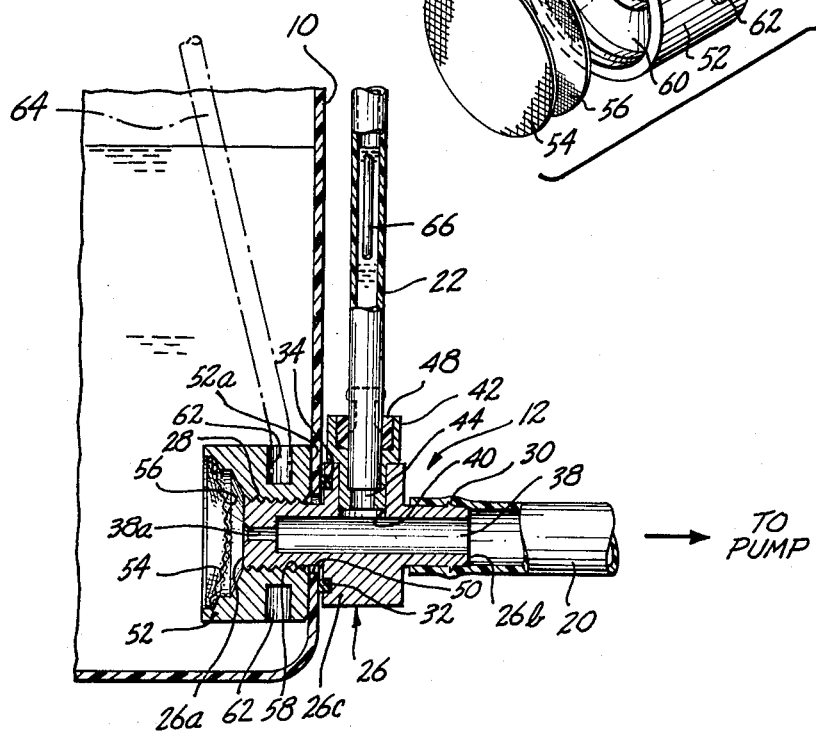

FLOW INDICATOR FOR POSITIVE DISPLACEMENT PUMP

FIELD OF THE INVENTION

The present invention relates to flow indicators, and more particularly to a flow indicator for a positive displacement liquid piston pump.

BACKGROUND OF THE INVENTION

Many industrial liquid supply systems employ positive displacement pumps having a suction stroke during which liquid is drawn from a reservoir into the inlet of the pump. On the return stroke, no liquid flow occurs into the pump inlet. For example, pneumatically powered, positive displacement pumps are utilized in conjunction with polyester resin application equipment to supply a relatively low viscosity liquid catalyst from a catalyst supply bottle to a location where the catalyst is mixed with the polyester resin, for example, in a resin spray head. Normally, the inlet to the pump is coupled to a conduit which in turn is inserted through the top opening in the catalyst supply bottle. The conduit inlet is positioned below the liquid level in the bottle, and preferably adjacent the bottom of the bottle. For example, the liquid level in the bottle may or may not be elevated above the location of the pump inlet. Thus, the conduit forms a siphon extending from the liquid in the bottle to the pump inlet. Resin catalysts such as methyl ethyl ketone peroxide do generate small amounts of gas during storage and use. During use, this gas accumulates in the low pressure area or upper reach of the siphon to form a bubble. The bubble has been advantageously used in the past to indicate that the positive displacement pump is in fact operating as intended. During the suction stroke of the pump, the bubble in the conduit is displaced from the uppermost reach of the siphon toward the inlet of the pump. During the pump return stroke, the bubble returns to the uppermost reach of the siphon. By visually monitoring the bubble movement, an indication of pump operability is obtained.

As the pump continues to operate, drawing liquid from the supply bottle, the bubble in the supply tube tends to grow because gases are generated by the liquid catalyst. If the pump operator does not carefully monitor the bubble growth, the bubble can grow sufficiently large so that the siphon from the supply bottle to the pump inlet is broken, allowing air to be drawn into the pneumatically powered pump. If air is drawn into the pump, the catalyst pump cavitates and will not pump the liquid catalyst until the operator reprimes the pump. In hot summer weather, the siphon may break several times a day, which can cause defective plastic parts due to lack of catalyst.

Accordingly, it is a broad object of the present invention to provide a fluid coupling between the liquid supply bottle and the pump inlet that eliminates the siphon effect normally encountered. It is a further object of the present invention to provide a fluid coupling that provides a visual indication of pump operation.

SUMMARY OF THE INVENTION

The foregoing objects, and other objects that will become apparent to one of ordinary skill upon reading the following specification, are fulfilled by a flow indicator for a positive displacement liquid pump. A first means defines a first passage having an inlet consructed for fluid connection to a source of liquid to be pumped and an outlet constructed for operable connection to the inlet of a positive displacement pump. A second means associated with the first means defines a second passage having an inlet in fluid communication with the first passage and an outlet open to the atmosphere. A restriction means is associated with the first passage to partially restrict flow from the liquid source through the first passage. The restriction means is positioned in the first passage upstream from the junction of the first passage and the second passage. A float means is movably positioned in the second passage for movement in reaction to a variation in fluid level in the second passage. The second means is constructed so that movement of the float in the second passage can be visually monitored by the pump operator. Preferably, a filter means is associated with the inlet to the first passage for inhibiting the introduction of foreign material into the flow indicator. Preferably, the outlet from the first passage is coupled to the inlet of a positive displacement pump by a conduit that extends downwardly from the first passage so that no gases can be trapped in the first conduit, thus eliminating the possibility of gas being drawn into the pump inlet.

BRIEF DESCRIPTION OF THE DRAWINGS

A better understanding of the present invention can be derived by reading the ensuring specification in conjunction with the accompanying drawings, wherein:

FIG. 1 is an elevation view of a liquid supply bottle with the flow indicator of the present invention mounted thereon;

FIG. 2 is an exploded isometric view of the flow indicator of the present invention; and FIG. 3 is a longitudinal sectional view through the flow indicator mounted on the liquid supply bottle.

DETAILED DESCRIPTION OF THE INVENTION

The reservoir for holding liquid catalyst in a liquid catalyst supply system is normally semitransparent polyethylene bottle 10. The flow indicator 12 of the present invention is inserted through an opening provided adjacent the bottom of the bottle. Liquid 14 within the bottle flows into the inlet 16 of the flow indicator 12, through a firt passage in the flow indicator to the outlet 18, which is coupled to a pump supply conduit 20. The supply conduit 20 extends downwardly from the outlet 18 and is in turn coupled to the inlet of a positive displacement pump (not shown), thereby placing the inlet of the pump in fluid communiction with the supply of liquid 14 in the bottle 10. As will be explained in greater detail below, a transparent or semitransparent sight tube 22, forming part of the flow indicator 12, extends upwardly from the flow indicator along the side of the bottle 10. The upper end 22a of the sight tube is routed through an opening in the neck of the bottle 10. Thus the outlet at the upper end 22a of the sight tube is vented to the interior of the bottle, which in turn is vented to atmosphere by an opening (not shown).

Referring to FIGS. 2 and 3, the main fitting 26 of the flow indicator 12 is machined from metal stock, preferably stainless steel. The cylindrically shaped inlet end 26a of the main fitting 26 is provided with external threads 28 while the cylindrically shaped outlet end 26b of the main fitting 26 is provided with a tube retention shoulder 30. The supply conduit 20 is slipped over the outlet end 26b and is retained thereon by the retention shoulder 30. The central portion 26c of the main fitting 26 is enlarged and machined into the form of a hexagonal nut. The rearwardly facing shoulder 26d of the central portion carries an annular groove 32 for receiving an O-ring 34. The O-ring abuts the outer surface of the sidewall of the bottle 10 when the fitting is affixed to the bottle, thus forming a seal to prevent leakage from the bottle.

The main fitting 26 is provided with an enlarged passage 38 in the form of a longitudinal bore extending from the outlet end 26b toward the inlet end 26a. The inlet end 38a of the longitudinal passage 38 is a reduced diameter bore that functions as a flow restriction orifice at the inlet end of the longitudinal passage 38. A secondary passage 40 extends radially upwardly from the longitudinal passage 38 through the central portion 26c and opens onto one of the hexagonal faces of the central portion. A union 42, also preferably machined from stainless steel stock, carries a central bore 44 and has a lower cylindrically shaped end 42a that is sized for a press fit into the secondary passage 40. The upper end 42b of the union 42 has an enlarged recess 46 communicating with the central bore 44 for receiving the lower end of the sight tube 22. A commercially available sealing member 48 is also received by the recess 46 and cooperates with the walls of the recess 46 in the union 42 and the lower end of the sight tube 22 to form a fluid seal. Thus, the interior of the sight tube 22 is placed in fluid communication with the longitudinal passage 38 in the main fitting 26 via the union 42 and the secondary passage 40.

The inlet end 26a of the main fitting 26 extends through an aperture 50 provided in the sidewall of the bottle 10 so that the threads 28 are exposed inside the bottle. A retention nut 52 performs the dual functions of retaining the fitting 26 on the bottle and housing filter elements 54 and 56. The retaining nut 52 is preferably composed of a polymeric material such as nylon or polyethylene and is machined from stock of the same material. The retaining nut 52 is cylindrically shaped, having an outer edge surface 52a that abuts the interior surface of the sidewall of the bottle 10. The retaining nut 52 has a central bore carrying internal threads 58 sized to engage the external threads 28 on the inlet end 26a of the main fitting 26. The inner end 52b of the retaining nut has an enlarged or flared recess 60 of cylindrical cross section. The filter elements 54 and 56 are circular and have a diameter slightly greater than the diameter of the recess 60. The filter elements are pressfitted into the recess 60 and thus retentively engaged in the retaining nut upstream from the inlet end 38a of the longitudinal passage 38 in the main fitting 26.

Since catalyst supply bottles such as bottle 10 normally have a relatively narrow neck, it is difficult if not impossible to reach into the bottle to position the retaining nut 52 during installation of the flow indicator. Thus, the retaining nut is provided with a plurality of radial bores 62 extending into the wall of the nut, but not communicating with the central bore of the nut. Referring to FIGS. 1 and 3, a steel wire having a diameter slightly larger than the bore 62 and being bent slightly at one end so that the end portion forms an obtuse angle with the remainder of the rod, is inserted into the passage. The nut 52 is thus retained on the end of the rod 64 so that the nut can be inserted through the neck of the bottle 10 and positioned adjacent the opening 50 in the sidewall of the bottle. The main fitting 26 is then inserted through the opening and threadably engaged with the retaining nut 52 until the O-ring seal 34 has been compressed sufficiently against the sidewall of the bottle 10 to form a fluid tight seal.

Prior to inserting the upper end 22a of the sight tube 22 through the opening in the neck of the bottle 10, a float 66 is slidably inserted into the tube. The float 66 has a cross section less than the inside diameter of the sight tube 22. The float 66 can be composed of a suitable material that has a specific gravity less than that of the liquid 14 in the bottle 10. Preferably, the float is composed of a short section of polymeric tubing, the ends of which have been sealed.

In use, the liquid 14 in the bottle flows through the filter elements 54 and 56, through the restriction 38a and the main passage 38, into the pump supply tube 20. At the same time, fluid flows upwardly through the secondary passage 40 into the sight tube 22, causing the float 66 to move upwardly to the level of the fluid in the bottle 10, thus providing an indication of the height of the fluid level within the bottle 10. During operation, the pump coupled to the supply conduit 20 normally cycles through a suction stroke during which liquid catalyst is drawn through the flow indicator 12 and the supply conduit 20 to the pump, and a return stroke, in which a valve associated with the pump prevents backflow through the conduit and thus stops fluid flow through the conduit and flow indicator 12. During the suction stroke, liquid is drawn through the main passage 38 and the inlet end 38a from the liquid in the bottle 10. However, because the restriction in the inlet end 38a partially restricts flow into passage 38 from the bottle 10, some liquid is drawn through the secondary passage 40 from the sight tube 22. The reduced diameter portion of the inlet end 38a in the main passage 38 in the flow indicator is sized so that the major portion of the fluid drawn into the pump passes through the restriction from the bottle, while only a minor portion of the fluid drawn into the pump is drawn from the sight tube 22, thus preventing all of the liquid from being drawn out of the sight tube 22 during any given suction stroke. As liquid is drawn from the sight tube 22, the float 66 drops with the liquid level in the sight tube. On the return stroke of the pump, when no flow occurs out of the flow indicator 12, the liquid level in the sight tube 22 again seeks the level of liquid in the bottle 10, returning the float 66 to the level of the liquid in the bottle. Thus, during each suction stroke, the float 66 drops in elevation, and during the return stroke of the pump returns to its original elevation. Thus, pump operation can be confirmed by visually monitoring movement of the float 66 in the sight tube 22.

The present invention has been described in relation to a preferred embodiment. One of ordinary skill after reading the foregoing specification will be able to effect various alterations and substitutions of equivalents without departing from the broad concepts disclosed herein. It is therefore intended that the scope of protection granted hereon be limited only by the definition contained in the appended claims and equivalents thereof.

The embodiments of the invention, in which an exclusive property or privilege is claimed are defined as follows:

1. In a fluid supply system including a source of liquid to be pumped and a positive displacement liquid pump, an improved flow indicator for a positive displacement pump comprising:

first means defining a first passage, said first passage having an inlet and an outlet, said inlet being adapted for coupling to said source of liquid to be pumped, said outlet being adapted for connection to the inlet of said positive displacement liquid pump, second means defining a second passage having an inlet and an outlet, said second means being at least partially transparent, said outlet being open to the atmosphere at a position above the surface of said source of liquid, said inlet being in fluid communication with said first passage at a location between the inlet and outlet of said first passage, restriction means in said first passage for partially restricting flow through said first passage, said restriction means being located between the inlet to said first passage and the location at which said second passage is in fluid communication with said first passage, and float means movably positioned in said second passage for movement along said passage in reaction to a variation in fluid level in said second passage.

2. The indicator of claim 1 further comprising:
filter means connected to said first means at a location upstream from the inlet to said first passage for inhibiting the introduction of foreign material into said first passage.

3. The indicator of claim 2 wherein said first means comprises a body through which said first passage extends, said conduit having an external shoulder facing in the direction of the inlet to said first passage, said source of liquid comprising a reservoir having a wall through which at least a portion of said body extends, said indicator further comprising:
seal means associated with said shoulder for abutting said wall in sealing relationship through which said conduit extends.

4. The indicator of claim 2 wherein said body has external threads adjacent said first inlet, said filter means comprising:
an internally threaded nut having an outwardly flared passage that extends away from the inlet to said first passage when said nut is threaded onto said body, and
a filter element positioned in said flared passage.

5. The indicator of claim 1 wherein said second means comprises a transparent tube, said float being movably mounted in said tube, said second means further comprising a passage in said body having one end communicating with said first passage and a second end opening outwardly from said body, said second end being sized to receive an end of said tube.

6. In a fluid supply system including a reservoir having a sidewall, a bottom and a top, and a positive displacement pump having an inlet, the improvement comprising:
a fitting including means defining a first passage having an inlet and an outlet, said fitting being adapted to extend through an opening in the sidewall of said reservoir adjacent the bottom of said reservoir so that the inlet to said first passage is located inside the reservoir below the level of liquid in said reservoir, and so that the outlet from said first passage is located exterior of said reservoir, said fitting being constructed so that said outlet is adapted for fluid coupling to the inlet of said pump, means for securing said fitting to said sidewall,
a transparent conduit extending upwardly from said fitting, said fitting including means defining a second passage having an outlet located externally from said reservoir and being sized to receive the lower end of said conduit in sealed relationship, the upper end of said conduit being located above the fluid level in said reservoir, said second passage being in fluid communication with said first passage at a location upstream from the outlet from said first passage, a float slidably positioned in said tube for floating movement in reaction to a change in liquid level in said tube, restriction means associated with said first passage upstream from the junction of said first and second passages for restricting the flow of liquid through said first passage.

7. The improvement of claim 6 further comprising:
filter means associated with said fitting upstream of said inlet to said first passage.

8. The improvement of claim 6 wherein the outlet from said fitting is adapted for coupling to a conduit in turn adapted for coupling to he inlet of said pump.

9. The improvement of claim 6 wherein said reservoir has an opening through a wall thereof located above the liquid level in said reservoir, said tube extending through said opening, said outlet from said tube being located inside said reservoir and being vented to the atmosphere.

* * * * *